United States Patent
Vergara et al.

(10) Patent No.: US 10,984,358 B1
(45) Date of Patent: Apr. 20, 2021

(54) METHOD AND SYSTEM FOR AUTOMATICALLY CONTROLLING ELECTRICAL POWER SUPPLY BASED ON PAYMENT STATUS

(71) Applicant: Zola Electric Labs Inc., San Francisco, CA (US)

(72) Inventors: Claudio Vergara, San Francisco, CA (US); Xavier Helgesen, San Francisco, CA (US); Joshua Pierce, Chico, CA (US)

(73) Assignee: Zola Electric Labs Inc., San Francisco, CA (US)

( * ) Notice: Subject to any disclaimer, the term of this patent is extended or adjusted under 35 U.S.C. 154(b) by 0 days.

(21) Appl. No.: 17/079,401

(22) Filed: Oct. 23, 2020

Related U.S. Application Data

(60) Provisional application No. 62/934,515, filed on Nov. 12, 2019.

(51) Int. Cl.
| | |
|---|---|
| *G06Q 10/06* | (2012.01) |
| *G06Q 20/40* | (2012.01) |
| *H02J 3/00* | (2006.01) |
| *G06Q 50/06* | (2012.01) |

(52) U.S. Cl.
CPC ..... *G06Q 10/06315* (2013.01); *G06Q 20/401* (2013.01); *H02J 3/003* (2020.01); *H02J 3/004* (2020.01); *G06Q 50/06* (2013.01); *H02J 2300/24* (2020.01)

(58) Field of Classification Search
CPC ........... G06Q 10/06315; G06Q 20/401; G06Q 50/06; H02J 3/003; H02J 3/004; H02J 2300/24
See application file for complete search history.

(56) References Cited

U.S. PATENT DOCUMENTS

| | | | |
|---|---|---|---|
| 7,478,070 B2 | 1/2009 | Fukui et al. | |
| 9,041,348 B2 | 5/2015 | Murawaka | |
| 9,369,074 B2 | 6/2016 | Tanaka et al. | |
| 9,465,398 B2 | 10/2016 | Forbes, Jr. | |
| 9,568,208 B2 | 2/2017 | West et al. | |
| 10,618,420 B2 | 4/2020 | Kondo | |
| 10,838,474 B2 | 11/2020 | Niwa | |
| 2010/0228687 A1* | 9/2010 | Lewis, Jr. ............ | G07F 15/003 |
| | | | 705/412 |

(Continued)

*Primary Examiner* — Ziaul Karim
(74) *Attorney, Agent, or Firm* — Kanika Radhakrishnan; Evergreen Valley Law Group

(57) ABSTRACT

The present disclosure provides methods and systems for automatically controlling power supply from an electrical power supply system to a user location based on payment status. The method performed by a central control unit includes determining a payment status of the electrical power supply system at the user location. The payment status is determined based at least on a time credit associated with the electrical power supply system. The method further includes facilitating control of the power supply from the electrical power supply system to the user location based on determining the time credit. The power supply to the user location from the electrical power supply system is uninterrupted, if the time credit is greater than a predefined threshold value. The power supply to the user location from the electrical power supply system is disconnected, if the time credit is less than the predefined threshold value.

18 Claims, 8 Drawing Sheets

(56) References Cited

U.S. PATENT DOCUMENTS

| | | | |
|---|---|---|---|
| 2011/0060653 A1* | 3/2011 | King | G06Q 30/0261 705/14.58 |
| 2014/0266061 A1* | 9/2014 | Wachal | H02J 7/0068 320/134 |
| 2014/0297206 A1* | 10/2014 | Silverman | G01R 22/063 702/58 |
| 2015/0339664 A1* | 11/2015 | Wong | H04L 9/3236 705/71 |
| 2016/0261676 A1* | 9/2016 | Nishimoto | G06F 16/24578 |

* cited by examiner

METHOD AND SYSTEM FOR AUTOMATICALLY CONTROLLING ELECTRICAL POWER SUPPLY BASED ON PAYMENT STATUS

TECHNICAL FIELD

The present disclosure relates to electricity power supply system, and more particularly relates to automatic power supply control in the electricity power supply system based on payment status.

BACKGROUND

Alternating current (AC) supply is used for powering electrical appliances at a customer location. The AC supply is generally received from the electrical utilities which provide electricity supply to the customer and/or user locations. In some cases, the user locations may be equipped with independently managed local power source or renewable energy resources (such as solar energy by employing photovoltaic (PV) panels) which is used as an auxiliary power source at the user locations. The use of the local power source leads to less dependence on the electrical energy supplied by the electrical service providers or electrical utilities. Further, the use of local power source for generating electricity at the user locations also reduces billing amount owed to the user.

However, purchasing and installation cost of the local power source at the user location is high which prevents the users with mid-to-low income to afford the local power source for generating electricity at the user locations. In other words, the mid-to-low income group users may not be able to pay the full amount at one instance to purchase and install the local power source. Further, countries with electricity supply concerns lack financial systems that provide loans for purchasing appliances to mid-to-low income residential and commercial users. Also, they do not include feasible provisions for an upfront payment to purchase standalone systems or the local power source to power appliances that require AC supply to operate. To overcome this problem, the mid-to-low income residential or commercial users may be provided with financial support by lending them loans to purchase the local power source. However, even after such assistance, the users may be delinquent in paying the loan amount associated with the purchase of the local power source. Thus, the collection of loan amount from the users is a cumbersome process and remains a practical challenge. Hence, it is important to devise means for encouraging users to make payments who have been provided financial assistance in deployment of the local independent power source and who are delinquent in paying the loan amount against such deployment and/or any other defined payment terms related to the deployment or consumption of the electrical supply generated from the local power source.

Therefore, there is a need for techniques that can overcome one or more limitations stated above in addition to providing other technical advantages.

SUMMARY

Various embodiments of the present disclosure provide methods and systems for controlling power supply from an independent electrical power supply system to user location.

In an embodiment, an independent electrical power supply system for providing power supply to a user location, is disclosed. The system includes a gateway AC battery. The gateway AC battery includes a central control unit. The central control unit is configured to at least determine a payment status of the electrical power supply system at the user location. The payment status corresponds to a payment of at least one of a lease amount, a rental amount and a loan amount associated with the electrical power supply system. The payment status is determined based at least on a time credit associated with the electrical power supply system. The central control unit is configured to facilitate control of the power supply from the electrical power supply system to the user location based at least on determining the time credit associated with the electrical power supply system. The power supply to the user location from the electrical power supply system is uninterrupted, if the time credit associated with the electrical power supply system is determined to be greater than a predefined threshold value. The power supply to the user location from the electrical power supply system is disconnected, if the time credit associated with the electrical power supply system is determined to be less than the predefined threshold value.

In another embodiment, a method performed by a central control unit for automatically controlling power supply from an independent electrical power supply system to a user location is disclosed. The method includes determining a payment status of the electrical power supply system at the user location. The payment status corresponds to a payment of at least one of a lease amount, a rental amount and a loan amount associated with the electrical power supply system. The payment status is determined based at least on a time credit associated with the electrical power supply system. The method further includes facilitating control of the power supply from the electrical power supply system to the user location based at least on determining the time credit associated with the electrical power supply system. The power supply to the user location from the electrical power supply system is uninterrupted, if the time credit associated with the electrical power supply system is determined to be greater than a predefined threshold value. The power supply to the user location from the electrical power supply system is disconnected, if the time credit associated with the electrical power supply system is determined to be less than the predefined threshold value.

In yet another embodiment, a method performed by a central control unit for automatically controlling power supply from an independent electrical power supply system to a user location is disclosed. The method includes determining a payment status of the electrical power supply system at the user location. The payment status corresponds to a payment of at least one of a lease amount, a rental amount and a loan amount associated with the electrical power supply system. The payment status is determined based at least on a time credit associated with the electrical power supply system. The method further includes facilitating control of the power supply from the electrical power supply system to the user location based at least on determining the time credit associated with the electrical power supply system. The power supply to the user location from the electrical power supply system is uninterrupted, if the time credit associated with the electrical power supply system is determined to be greater than a predefined threshold value. The power supply to the user location from the electrical power supply system is disconnected, if the time credit associated with the electrical power supply system is determined to be less than the predefined threshold value. A first signal is transmitted to at least one AC-DC power conditioning unit (PCU) of a gateway AC battery and at least one expansion AC battery, if the time credit associated with the electrical power supply system is less than the predefined threshold value. The first signal prevents the at least one AC-DC power conditioning unit to generate power, thus resulting in disconnection of the power supply from the electrical power supply system to the user location.

BRIEF DESCRIPTION OF THE FIGURES

The following detailed description of illustrative embodiments is better understood when read in conjunction with the appended drawings. For the purpose of illustrating the present disclosure, exemplary constructions of the disclosure are shown in the drawings. However, the present disclosure is not limited to a specific device or a tool and instrumentalities disclosed herein. Moreover, those in the art will understand that the drawings are not to scale. Wherever possible, like elements have been indicated by identical numbers.

Figure 1:
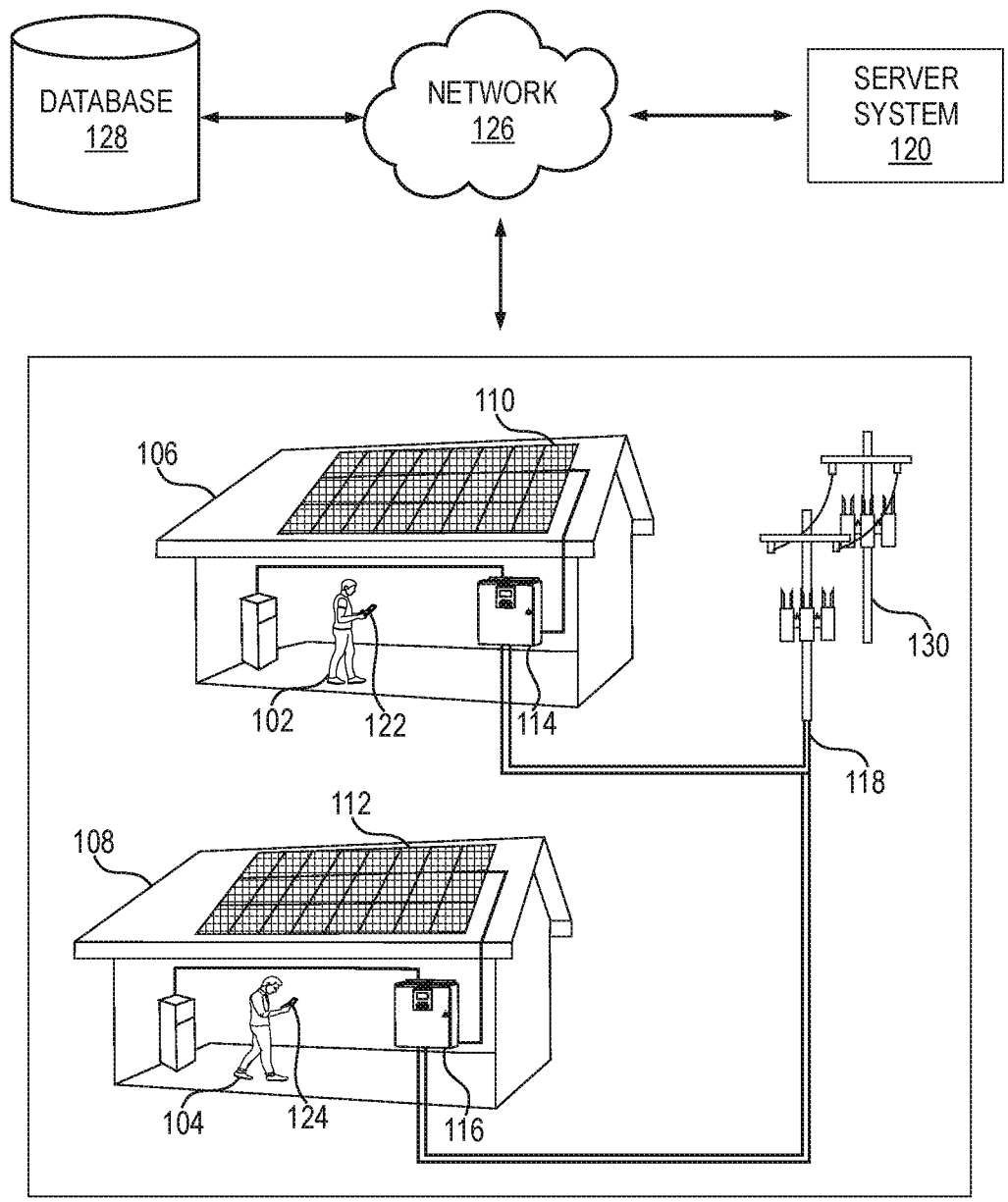
FIG. 1 is an example representation of an environment related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The terms "consumer", "customer" and "user" have been used interchangeably throughout the description, and they refer to any person, entity, or group that uses the power supply provided by the power supply companies.

The term "electrical power supply system" refers to an electrical network of one or more components deployed to supply, transfer and use electric power. The majority of the electrical power supply system(s) uses three-phase alternating current (AC) power for the large scale power transmission and distribution. Further, most of the customer sites (e.g., home) are generally provided with single-phase power supply, and the three-phase power supply is typically used in commercial/industrial situations and large homes.

Overview

Various embodiments of the present disclosure provide methods and systems for automatically controlling electrical power supply based on payment status. In one embodiment, the system includes a gateway alternating current (AC) battery. Without limiting to the scope of the present disclosure the gateway AC battery may be electrically connected to at least one expansion AC battery, a plurality of photovoltaic (PV) panels, and one or more transmission lines. The electrical power supply system is equipped at a user location of a user for supplying electric power to electrical outlets at the user location.

The gateway AC battery includes a central control unit configured to control the power supply from the electrical power supply system based at least on the payment status of the electrical power supply system and the power supply from the one or more transmission lines. The central control unit determines a time credit associated with the electrical power supply system for determining the payment status. The time credit is determined based at least on the successful payment of at least one of a lease amount, a rental amount and a loan amount associated with the electrical power supply system. The user is required to pay the at least one of the lease amount, the rental amount and the loan amount of a previous payment cycle associated with the electrical power supply system to continue power supply from the electrical power supply system at the user location until the end of the next payment cycle.

In one scenario, if the time credit associated with the electrical power supply system becomes less than the predefined threshold value, the central control unit may be configured to transmit a first signal to at least one AC-DC power conditioning unit (PCU) of the gateway AC battery and the at least one expansion AC battery. The first signal prevents the at least one PCU to supply power from the gateway AC battery and the at least one expansion AC battery. Thus, the user location is provided with power supply only from the transmission lines. Further, if the payment is received after the disconnection of the electrical power supply to the user location, the central control unit is configured to transmit a control signal to at least one PCU for enabling the power supply to the user location from the electrical power supply system.

Additionally, the central control unit is configured to monitor the power supply from the transmission lines for enabling the gateway AC battery and the at least one expansion AC battery to supply power to the user location. If the transmission lines are not energized or the transmission lines fail, the central control unit is configured to stop sending a connect signal to a circuit breaker of at least one circuit breaker electrically connected to a power receiving port of the gateway AC battery. The absence of the connect signal results the circuit breaker to be in the disconnected state from the connected state. In this scenario, at least one AC-DC PCU of either the gateway AC battery or of an expansion AC battery automatically and instantaneously pick up the load and supply power from the electrical power supply system to the user location. Further, if the transmission lines are available for power supply, the central control unit transmits the connect signal to the circuit breaker electrically connected to the power receiving port. The connect signal operates the circuit breaker to the connected state from the disconnected state, thus coupling the transmission lines to the electrical power supply system for providing power supply to the user location.

The central control unit is communicably coupled to a server system. The server system can be communicably accessed by a user device of the user. The central control unit is configured to determine the payment status of the electrical supply system based on the time credit. The time credit associated with the electrical supply system is updated based on the successful payment of the at least one of the lease, rental and loan amount associated with the electrical power supply system. In one form, the server system transmits a notification indicative of the successful payment to the central control unit. In another form, the server system transmits a unique dynamic code to the user device of the user upon the successful payment. The user manually enters the unique dynamic code on an input interface configured on the gateway AC battery which enables the power supply from the electrical power supply system to be uninterrupted until the end of the next payment cycle.

Although process steps, method steps, or the like in the disclosure may be described in sequential order, such processes and methods may be configured to work in alternate orders. In other words, any sequence or order of steps that may be described in this patent application does not, in and of itself, indicate a requirement that the steps need to be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention (s), and does not imply that the illustrated process is preferred.

Various embodiments of methods and systems for automatically controlling electrical power supply based on payment status are further described with reference to FIG. 1 to FIG. 7.

Figure 2:
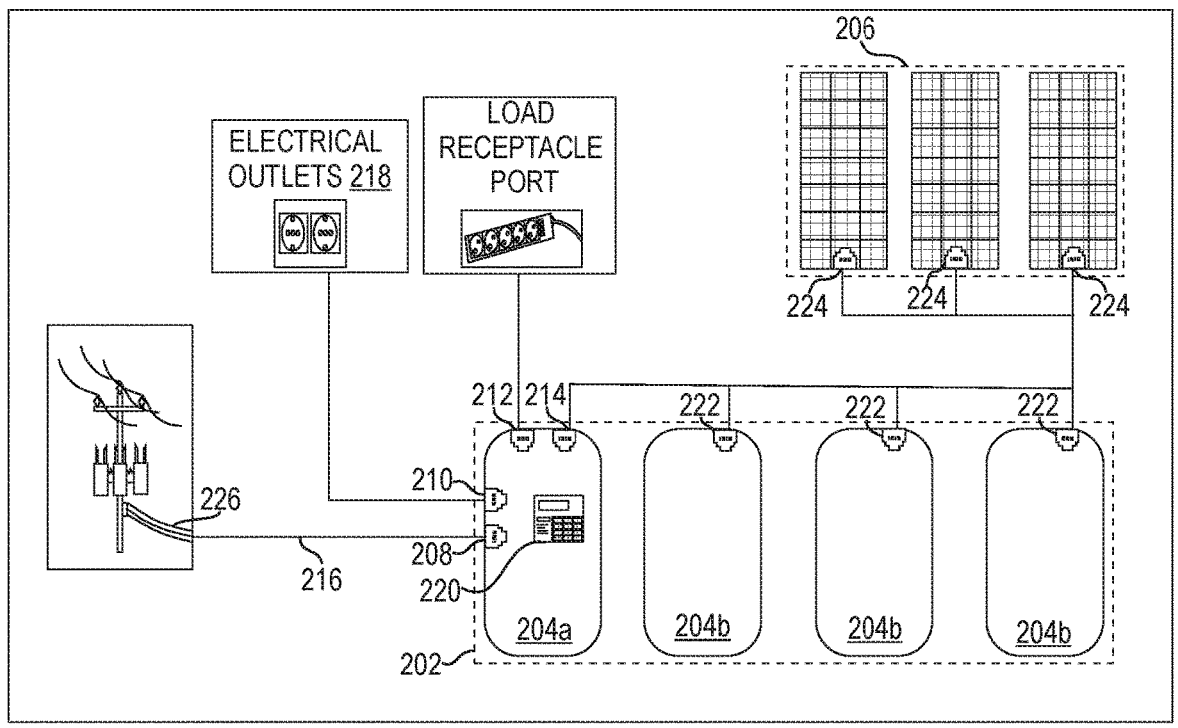
FIG. 2 is a schematic representation of a power distribution network at a user location, in accordance with some example embodiments of the present disclosure.

FIG. 1 is an example representation of an environment 100 related to at least some example embodiments of the present disclosure. The environment 100 depicts distribution of power supply to one or more customer sites via an electrical power supply system equipped at the customer sites. The environment 100 includes users 102 and 104 who may be any individual and/or an entity, in need of electricity for powering electrical loads at user locations 106 and 108 respectively. The user locations 106 and 108 may be homes, offices, industries, and the like. The user locations 106 and 108 (exemplary depicted to be "house") are equipped with a local power source 110 and a local power source 112 respectively. The local power sources 110 and 112 are electrically coupled to an electrical power supply system 114 and an electrical power supply system 116 respectively. For the purposes of the present description, the user location 106 equipped with the local power source 110 and electrically coupled to the electrical power supply system 114 is used throughout the present disclosure, and the same description holds true for the user location 108 or any other similar user location. Further, the local power source 110 equipped at the user location 106 is exemplarily depicted to be solar panels and/or photovoltaic (PV) panels. Additionally or alternatively, the local power source 110 may include, but not limited to, wind source, biogas source, low-power hydroelectricity, and the like. The electrical power supply system 114 includes one or more battery packs as an auxiliary power source due to usage of the local power source 110 (e.g., as shown in FIG. 2). The battery packs are configured to store charges and provide power supply to the user location 106. Further, the battery packs form an integral component of the electrical power supply system 114 which is further explained in detail. The electrical power supply system 114 receives power through one or more transmission lines 118 or the local power source 110 to supply electric power to the user location 106.

The transmission lines 118 are associated with a power grid 130. The power grid 130 may provide different ranges of voltage supply such as a medium voltage or of any other voltage levels. The power grid 130 may be equipped with low voltage transformers for controlling the voltage levels to be delivered to the user location 106. The electric power is transferred to various distribution sites and customer sites, such as the user location 106 via the transmission lines 118. The power supply from the transmission lines 118 is distributed to the electrical power supply systems 114 and 116s of the user locations 106 and 108 respectively as explained above. Upon receiving the electrical power, the storage batteries associated with the electrical power supply system 114 is charged for providing power supply to the electrical loads present at the user location 106 during diverse cases which is further explained in detail. Further, the electrical power supply system 114 is configured to manage the electrical power from the local power source 110 and the storage batteries at the user location 106.

The environment 100 further depicts a server system 120 configured to perform one or more operations as described herein. The server system 120 is configured to transmit a payment amount to user devices 122 and 124 associated with the users 102 and 104, respectively for receiving payment as part of a lease amount, a rental amount or a loan amount for the electrical power supply systems 114 and 116. Some examples of the user devices 122 and 124 may include, but not limited to, laptops, smartphones, desktops, tablets, wearable devices, workstation terminals, and the like. In an embodiment, the server system 120 being communicably coupled to the electrical power supply system 114 may be configured to control the power production at the customer site, such as the user location 106 based on the payment status associated with the electrical power supply system 114 at the user location 106. The server system 120 can be embodied in at least one computing device in communication with the network 126, which may be specifically configured, via executable computer-readable instructions, to perform functions as described herein.

The network 126 may be a centralized network or a decentralized network or may include a plurality of sub-networks. In an example, the network 130 may be wired or wireless communication protocols such as, Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof. The network 126 may include, without limitation, a local area network (LAN), a wide area network (WAN) (e.g., the Internet), a mobile network, a virtual network, and/or another suitable public and/or private network capable of supporting communication among two or more of the entities illustrated in FIG. 1, or any combination thereof.

The environment 100 further includes a database 128 configured to store information pertaining to one or more rules associated with the electrical supply system 114. The one or more rules may be associated with the payments (i.e., lease, rental or loan amounts) associated with the electrical power supply system 114. The database 128 may also store historical data of electrical energy usage, payment cycle, and transaction records and the like. The database 128 may be maintained by a third party or embodied within the server system 120.

The power supply from the electrical power supply system 114 to the user location 106 is controlled based on the payment status associated with the electrical power supply system 114. The payment status associated with the electrical power supply system 114 correspond to the payments as part of the lease, rental or loan amount. In other words, the user 102 may purchase or make use of the electrical power supply system 114 by using a payment mode such as, but not limited to, the lease, loan or rental. In this scenario, the user 102 should pay the amount as subscribed in the payment mode i.e., the lease, loan or rental for using the electrical power supply system 114 as an auxiliary power supply or as an independent power supply system at the user location 106.

In one example scenario, the user 102 may settle the payment amount associated with the electrical power supply system 114 by using the user device 122. The user 102 may access an application installed in the user device 122 for settling the payment amount owed to the user 102. The application accessible on the user device 122 may be hosted and managed by the server system 120. In another example scenario, the user 102 may visit a local payment location (e.g., store, or an outlet dealing with the electrical power supply system) for settling the payment amount associated with the electrical power supply system 114. Upon successful payment, the electrical services or power supply from the electrical power supply system 114 is continued until the end of a next payment cycle. The payment cycle may vary based at least on the selection of the payment mode (i.e., loan, lease or rental). Further, if the user 102 is delinquent with respect to the payments associated with the use of the electrical power supply system 114, the power supply from the electrical power supply system 114 to the user location 106 is disconnected.

The power supply from the electrical power supply system 114 to the user location 106 is controlled by a central control unit (see 320, of FIG. 3A) of the electrical power supply system 114. More specifically, the central control unit controls the power supply based on determining the payment status. The payment status is determined by the central control unit based on a time credit associated with the electrical power supply system 114 which is explained with reference to FIGS. 3A and 3B. In one scenario, if the time credit is determined to be greater than the predefined threshold value, the power supply from the electrical power supply system 114 is uninterrupted until the end of the next payment cycle. In another scenario, if the time credit is determined to be less than the predefined threshold value, the power supply from the local power source 110 and the storage batteries associated with the electrical power supply system 114 is disconnected at the beginning of the next payment cycle.

Further, the time credit is updated on each successful payment, thus continuing the power supply to the user location 106 depending upon the value of the time credit. In one form, the central control unit receives a notification from the server system 120, indicative of the successful payment. In another form, the server system 120 may transmit a unique dynamic code to the user device 122 based on the successful payment. The unique dynamic code is specific to each power supply system, such as the electrical power supply system 114.

FIG. 2 is a schematic representation of a power distribution network 200 at a user location, such as the user location 106, in accordance with some example embodiments of the present disclosure. As shown in FIG. 2, the power distribution network 200 of a single house, such as the user location 106, includes an electrical power supply system 202 and a plurality of PV panels 206 associated with one or more micro inverters. The plurality of PV panels 206 is the local power source 110 as described with reference to FIG. 1. The number of PV panels, such as the PV panels 206 may be selected based on the energy requirements or load demands at the user location 106.

The electrical power supply system 202 receives power through the transmission lines 226 or the PV panels 206 and delivers power to the user location 106 in diverse cases which will be explained with reference to FIGS. 3A and 3B. The electrical power supply system 202 and the transmission lines 226 are an example of the electrical power supply system 114 or 116 and the transmission lines 118, respectively, of FIG. 1. The electrical power supply system 202 may also receive electric power from sources such as an electric generator. The electric generators may be such as, but not limited to, a synchronous generator, shunt generators, and the like.

The electrical power supply system 202 includes AC batteries 204a-204b, wherein the AC battery 204a is a gateway AC battery 204a and AC batteries 204b are expansion AC batteries (hereinafter collectively referred to as "expansion AC battery 204b"). In general, the AC batteries 204a-204b correspond to a set of converters that create AC current out of DC battery supplies. The AC batteries 204a-204b are configured to provide a bidirectional flow of AC current for power distribution at the user location 106.

The gateway AC battery 204a is configured with one or more input and output ports, such as a power receiving port 208, a load terminal port 210, a load receptacle port 212, and an expansion port 214 to either receive or deliver the electric power. The port 208 includes an electrical connection 216 that electrically connects the gateway AC battery 204a to a remote power system via the transmission lines 226. For example, the electrical connection 216 may be a mainstream distribution network, or a backup generator (e.g., synchronous generator). The electrical connection 216 including the backup generator may be configured to perform synchronizing operation in case of failures in the transmission lines 226.

Further, the port 210 of the gateway AC battery 204a is configured to supply power to the electrical outlets 218 at the user location 106. The port 212 is configured to directly receive a plug of electrical appliances at the user location 106 through a power strip. For example, the port 212 may be an electrical socket box configured on the gateway AC battery 204a to receive the plug from the electrical appliances (e.g., as shown in FIG. 2). The electrical outlets 218 and the electrical appliances plugged to the port 212 are collectively referred to as electrical loads of the user location 106. Further, each of the expansion AC battery 204b and the PV panels 206 includes a port 222 and a port 224 respectively. The ports 214, 222 and 224 are configured to electrically connect the gateway AC battery 204a, the expansion AC battery 204b and the PV panels 206 respectively in a daisy chain configuration. The daisy chain configuration of the gateway AC battery 204a, the expansion AC battery 204b, and the PV panels 206 results in the formation of AC strings. In general, the daisy chain configuration corresponds to a wiring scheme used in a large scale power system in which multiple devices are wired together in sequence to form a full or single loop. Further, the expansion AC battery 204b is selected based on the load demands. As a result, the expansion AC battery 204b is electrically connected to the gateway AC battery 204a to provide power supply based on the energy requirements or load demands at the user location 106. In other words, the expansion AC battery 204b is utilized in the electrical power supply system 202 to either meet higher load demands or to increase the total run time of the electrical power supply system 202.

In an embodiment, the AC batteries 204a and 204b, and the PV panels 206 may be electrically connected in a bottom-up microgrid configuration (not shown in FIGS.). The AC strings formed due to electrical connection of the AC batteries 204a and 204b, and the PV panels 206 in the bottom-up microgrid configuration may provide power supply to one or more customer sites (such as the user locations 106 and 108). In this scenario, the power supply to the user locations 106 and 108 may be provided by employing a meshed wireless network and a microgrid control unit (not shown in FIGS.). The meshed wireless network and the micro grid control unit collectively operate to distribute power in a controlled manner to the user locations 106 and 108 and maintain stable and safe electrical operations.

In one form, the AC batteries 204a and 204b electrically connected to the transmission lines 226 are configured to provide power supply to the electrical outlets, such as the electrical outlets 218. In another form, the PV panels 206 electrically connected to the AC batteries 204a and 204b directly provide the power supply to the electrical outlets 218 in diverse cases which are explained in detail in further paragraphs. The gateway AC battery 204a and the expansion AC battery 204b include a local distribution network and/or local bus bar for providing AC power supply received from the transmission lines 226, the PV panels 206 or the combination of both. Further, the gateway AC battery 204a includes an input interface 220. The user 102 manually enters the unique dynamic code on the input interface 220. For example, the input interface 220 may be a built-in keypad, where the user 102 enters the unique dynamic code. In one embodiment, the gateway AC battery 204a may include a display screen configured to display the energy consumption data from the transmission lines 226.

The gateway AC battery 204a further includes a central control unit configured to control the power supply to the electrical outlets 218, the electrical appliances connected to the load receptacle port 212 and operating conditions of the expansion AC battery 204b. In other words, the AC battery 204a includes the central control unit configured to distribute and store the generated power to maximize the utilization of PV energy and maintain a reliable power supply during failures of the transmission lines 226. In addition, the central control unit controls the power supply at the user location 106 based on determining the payment status associated with the electrical power supply system 202. The payment status of the electrical power supply system 202 is represented in the time credit. The user 102 is required to settle the payment amount associated with the electrical power supply system 202 to prevent discontinuity of the power supply from the electrical power supply system 202 and the PV panels 206 at the user location 106. As a result, the central control unit is configured to update the time credit that prevents disconnection of the power supply from the electrical power supply system 202 and the PV panels 206 at the user location 106 until the end of the next payment cycle. The time credit is updated based at least on receiving the notification or the unique dynamic code as explained with reference to FIG. 1. Further, the operations performed by the central control unit of the gateway AC battery 204a are herein described in detail with reference to FIGS. 3A and 3B.

Figure 3A:
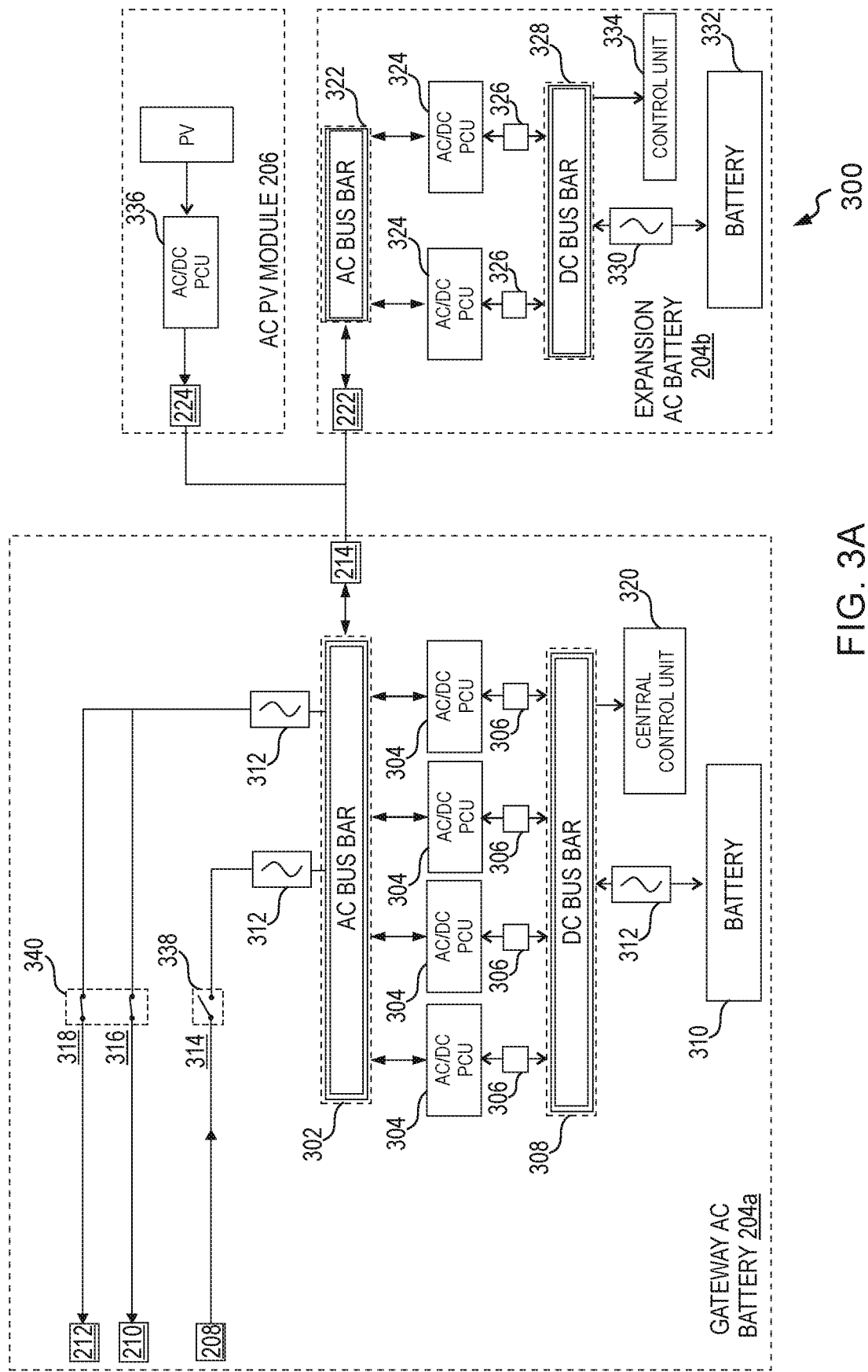
FIGS. 3A and 3B represent control operations performed by a central control unit of a gateway AC battery to automatically control the power supply from the electrical power supply system of FIG. 2, in accordance with an example embodiment of the present disclosure.
Figure 3B:
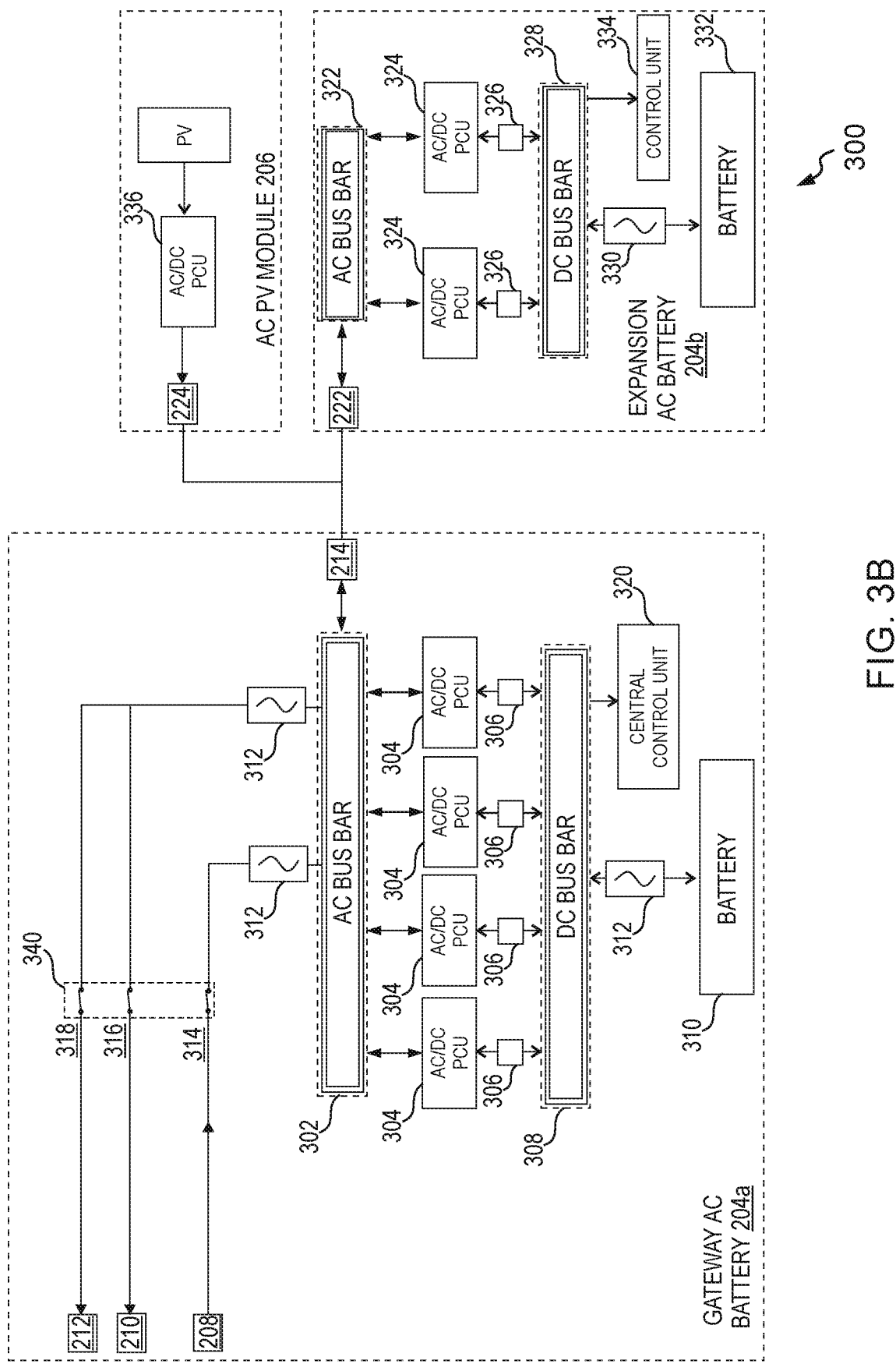

FIGS. 3A and 3B represent control operations performed by a central control unit to automatically control the power supply from an electrical power supply system, such as the electrical power supply system 202 of FIG. 2, in accordance with an example embodiment of the present disclosure.

As shown in FIG. 3A, a schematic representation of the internal architecture of the electrical power supply system 202 is illustrated. More specifically, the internal architecture of the gateway AC battery 204a, the expansion AC battery 204b and the local power source, such as the PV panels 206 is depicted. For illustrative purposes, the internal architecture of only one of the expansion AC battery 204b is shown and described herein.

The internal architecture of the AC battery 204a includes an AC bus bar 302 electrically connected to at least one of AC-DC power conditioning unit (PCU) 304 (hereinafter referred to as 'AC-DC PCU 304'). The AC bus bar 302 corresponds to a local AC bus bar or a load bus that distributes power to the electrical outlets 218 and the electrical appliances connected to the load receptacle port 212 present in the user location 106. The AC bus bar 302 may be selected from at least one current conducting material such as but not limited to, copper, brass and the like. In an embodiment, the AC bus bar 302 may be plated with a metallic material to increase electrical conductivity.

Further, each of the AC-DC PCU 304 is electrically connected to a switching device 306 that is further electrically connected to a DC bus bar 308. Each of the AC-DC PCU 304 communicates with the DC bus bar 308 via the switching device 306. It should be noted that the AC-DC PCU 304 is an example of bidirectional AC-DC converters/invertors that are configured to convert power from either AC to DC or DC to AC based on feasibility and requirements. Further, four AC-DC PCU 304 in the gateway AC battery 204a are merely illustrative, and they can be in any other number depending upon feasibility and requirement. The switching device 306, electrically connected to each of the AC-DC PCU 304 and the DC bus bar 308, is configured to either connect or disconnect the AC-DC PCU 304 from a battery 310 based on the load demands. For example, the switching device 306 may be an electronic switching device such as, but not limited to a solid state switch. In an embodiment, the switching device 306 may be selected to be one of an electromechanical switching device as per design feasibility and requirements.

Further, the battery 310 is electrically connected to the DC bus bar 308 through an electrical safety device 312. More specifically, the electrical safety device 312 connected between the DC bus bar 308 and the battery 310, may be configured to protect the battery 310 in faulty conditions (e.g., over current and over voltage). The battery 310 may be a DC battery such as, but not limited to, a lithium iron phosphate (LiFePo) battery, a Lithium ion battery, Lithium polymer (LiPo) battery, and the like.

The gateway AC battery 204a further includes at least one circuit breaker, such as a circuit breaker 314, a circuit breaker 316 and a circuit breaker 318. The circuit breaker 314 is electrically connected between the power receiving port 208 and the AC bus bar 302. The circuit breaker 314 is configured to separate the AC bus bar 302 from the external power distribution network, such as the transmission lines 226. Further, an electrical safety device, such as the electrical safety device 312 is electrically connected between the AC bus bar 302 and the circuit breaker 314. The circuit breaker 314 may be an electromechanical non-latching contactor in a normally-open (NO) configuration. The NO configuration of the circuit breaker 314 enables automatic reset operation by an internal spring mechanism, based on power supply to a coil of the circuit breaker 314. For instance, the operating time and/or reset time of the circuit breaker 314 may be about 200 milliseconds (ms).

The circuit breaker 316 is electrically connected between the load terminal port 210 and the AC bus bar 302. The circuit breaker 318 is electrically connected between the load receptacle port 212 and the AC bus bar 302. The circuit breakers 316 and 318 may be referred to as load circuit breakers. Further, the circuit breakers 316 and 318 are configured to control the power supply to the electrical outlets, such as the electrical outlets 218 and the electrical appliances respectively, at the user location 106. Additionally, the electrical safety device 312 is electrically connected between the AC bus bar 302 and the circuit breakers 316 and 318. Further, the gateway AC battery 204a includes a central control unit 320 electrically connected to the DC bus bar 308 and configured to control the power supply from the electrical power supply system 202.

Further, the AC bus bar 302 of the gateway AC battery 204a is electrically connected to an AC bus bar 322 of the expansion AC battery 204b and to an AC-DC PCU 336 of one PV panel of the PV panels 206. The AC-DC PCU 336 electrically connected to the PV panel 206, corresponds to the internal architecture of one PV panel of the PV panels 206 and may be referred to as "AC PV module". It is evident, that the AC power from the expansion AC battery 204b is provided to the electrical outlets 318 and electrical appliances due to the electrical connection of the AC bus bar 302 and the AC bus bar 322.

The power supply from the transmission lines 226 or the PV panels 206 is utilized to charge the battery 310 associated with the gateway AC battery 204a. It is understood that the battery 310 is configured to store DC charges. Therefore, the AC-DC PCU 304 are configured to convert the power supply (i.e., AC power) at the AC bus bar 302 to DC power. The DC power is received at the DC bus bar 308 for charging the battery 310 for providing power supply to the electrical loads when there is a failure of the transmission lines 226. In addition, the battery 310 may be charged by the power supply from the PV panels 206.

The DC bus bar 308 supplies the DC power to the central control unit 320 for powering one or more components of the central control unit 320. The central control unit 320 is configured to control the charging of the battery 310 based on the availability of power supply from the transmission lines 226 and the PV panels 206. Alternatively, the battery 310 may be charged from power supply from the other batteries (e.g., the expansion AC battery 204b). In an embodiment, the central control unit 320 may be configured to maximize the utilization of the power supply from the PV panels 206 by utilizing the electricity from the transmission lines 226 at low-cost condition for charging the AC batteries 204a and 204b and for providing the power supply to the user location 106. As a result, the tariff in the electricity bill owed to the user 102 is reduced. In another embodiment, the energy stored in the battery 310 may be transmitted to the transmission lines 226, which reduces the tariff in the electricity bill owed to the user 102. Further, the central control unit 320 is configured to monitor power supply from the transmission lines 226 to operate the AC batteries 204a and 204b for providing the power supply to the user location 106 which is explained in detail in further paragraphs.

The expansion AC battery 204b includes at least one AC-DC PCU 324, a switching device 326, a DC bus bar 328, an electrical safety device 330, a battery 332 and a control unit 334. For illustrative purpose, only two AC-DC PCUs 324 are illustrated in the internal architecture of the expansion AC battery 204b and they can be of any number. The internal architecture of the expansion AC battery 204b is similar to the internal architecture of the gateway AC battery 204a. Therefore, for the sake of brevity, the internal architecture of the expansion AC battery 204b i.e., the electrical connection between the one or more components of the expansion AC battery 204b is herein not described again in detail. The control unit 334 of each of the expansion AC battery 204b is communicably coupled to the central control unit 320 of the gateway AC battery 204a. Thus, charging of the battery 332 and power distribution from the expansion AC battery 204b are controlled by the central control unit 320, as explained above.

The central control unit 320 is configured to selectively operate at least one of the circuit breakers 314, 316 and 318 to either a disconnected state (see, 338 of FIG. 3A) or a connected state (see, 340 of FIG. 3A) for controlling the power supply at the user location 106. The circuit breakers 314, 316 and 318 are operated in the disconnected state or the connected state based on a connect signal from the central control unit 320.

In one scenario, the central control unit 320 operates the circuit breaker 314 to the disconnected state from the connected state (e.g., as shown in FIG. 3A), if the transmission lines 226 are determined to be not energized or if the transmission lines 226 fail. More specifically, the central control unit 329 stops sending the connect signal to the circuit breaker 314. The absence of the connect signal operates the circuit breaker 314 to the disconnected state. The circuit breaker 314 in the disconnected state (see, 338 of FIG. 3A) decouple the transmission lines 226 from the electrical power supply system 202. Further, the user location 106 is provided with power supply from the AC batteries 204*a* and 204*b* and the PV panels 206 due to operation of the circuit breakers 316 and 318 in the connected state (see, 340 of FIG. 3A). In this scenario, the AC-DC PCUs 304 and 324 are operated for providing power (i.e., AC power) to the user location 106 from the charged storage batteries 310 and 332. In other words, the AC-DC PCUs 304 and 324 pick up the load instantaneously for providing power supply to the user location 106, if the transmission lines 226 is not energized or fail. In particular, the AC-DC PCUs 304 and 324 convert the DC power stored in the batteries 310 and 322 to the AC power for providing power supply to the user location 106 in case of failure of the transmission lines 226.

In another scenario, the central control unit 320 is configured to operate the circuit breaker 314 to the connected state from the disconnected state (e.g., as shown in FIG. 3B) based on determining the power supply from the transmission lines 226. More specifically, the central control unit 320 is configured to monitor voltage amplitude, frequency and phase angle to operate the circuit breaker 314 to the connected state (e.g., as shown in FIG. 3B). Upon determining the above mentioned parameters are in safe limits, the central control unit 320 transmits the connect signal to operate the circuit breaker 314 to the connected state from the disconnected state (e.g., as shown in FIG. 3B). In other words, the circuit breaker 314 is operated to the connected state from the disconnected state, if the electrical power supply system 202 was previously operating in the backup mode.

Further, the AC-DC PCUs 304 and 324 are configured to synchronously perform frequency and voltage droop operation. The amount of active and reactive power exchanged by each of the AC-DC PCUs 304 and 324 is biased from the central control unit 320. The biasing of the AC-DC PCUs 304 and 324 depends on the availability of transmission lines 226. In one form, when the electrical power supply system 202 is connected to the transmission lines 226, the biasing of the AC-DC PCUs 304 and 324 is based on a requirement for charging or discharging the power from batteries 310 and 332, respectively. In another form, when the electrical power supply system 202 is disconnected from the transmission lines 206, the AC batteries 204*a* and 204*b* are biased in order to maintain frequency and voltage at nominal values for supplying power from the AC batteries 204*a* and 204*b* to the user location 106.

The central control unit 320 is configured to control the power supply from the electrical power supply system 202 and the PV panels 206 to the user location 202 based on the payment status. More specifically, the central control unit 320 is configured to determine the payment status associated with the electrical power supply system 202 based on the time credit. The payment status is indicative of the payments as part of the lease, rental or loan amount associated with the electrical power supply system 202. Thus, based on the time credit, the central control unit 320 determines the payment status to be either normal or less than the predefined threshold value.

In one scenario, based on the successful payment of either the lease, the rental or the loan amount of a previous payment cycle, the central control unit 320 updates the time credit associated with the electrical power supply system 202. The previous payment cycle corresponds to a time period of usage of the electrical power supply system 202 for providing power supply at the user location 106. Thus, the payment cycle varies based on the payment mode selected by the user 102 for the purchase, lease or rental of the electrical power supply system 202. For instance, if the user 102 opts the lease mode for usage of the electrical power supply system 202, the user 102 should pay the lease amount associated with the electrical power supply system 202 for a specified time to use the electrical power supply system 202 for providing power supply at the user location 106. Further, if the user 102 opts the rental mode, the user 102 should pay the rental amount associated with the electrical power supply system 202 for a specified time (e.g., monthly, quarterly etc.) to use the electrical power supply system 202 for providing power supply. Furthermore, if the user 102 opts the loan mode to purchase the electrical power supply system 202, the user 102 should pay the loan amount or the full amount associated with the electrical power supply system 202 in recurring payments for a period of time.

In an example scenario, the user 102 may pay the full amount associated with the electrical power supply system 202 at one instance during the purchase of the electrical power supply system 202. In this scenario, the central control unit 320 operates the electrical power supply system 202 based on monitoring the power supply from the transmission lines 226 as explained above. Thus, the control of power supply from the electrical power supply system 202 based on the payment status is eliminated, if the user 102 settles the full amount during the purchase of the electrical power supply system 202. In other words, the electrical power supply system 202 is permanently activated for providing power supply from the AC batteries 204*a* and 204*b*, and the PV panels 206 at the user location 106.

The time credit associated with the electrical power supply system 202 is updated based on the successful payment. In particular, the time credit is updated based on either receiving the notification from the server system 120 via the network 126 or entering the unique dynamic code on the input interface 220 as explained with reference to FIGS. 1 and 2. In this scenario, the time credit is determined to be greater than the predefined threshold value. To that effect, the central control unit 320 operates the electrical power supply system 202 to provide power supply to the user location 106 until the end of the next payment cycle. In other words, if a payment is received by the end of the previous payment cycle, the electrical power supply system 202 continues producing power until the end of the next payment cycle.

In another scenario, if the user 102 fails to pay the payment amount i.e., the lease, the rental or the loan amount associated with the electrical power supply system 202, the time credit associated with the electrical power supply system 202 is determined to be less than the predefined threshold value. In this case, the power supply from the electrical power supply system 202 is discontinued at the user location 106. More specifically, the central control unit 320 is configured to transmit a first signal to the AC-DC PCUs 304 and 324, if the time credit is less than the predefined threshold value or the time credit is expired. The first signal prevents power production from the gateway AC battery 204*a* and the expansion AC battery 204*b*. In addition, the central control unit 320 may transit the first signal to the AC-DC PCU 336 of the PV panels 206, to prevent power production. Thus, the power supply to the user location 106 from the PV panels 206 and the AC batteries 204*a* and 204*b* is disconnected at the beginning of the next payment cycle. In this scenario, the user location 106 is provided with power supply only from the transmission lines 226 due to operation of the circuit breakers 314, 316 and 318 in the connected state (see, 340 of FIG. 3B). Thus, the electrical power supply system 202 may continue to operate and maintain the batteries 310 and 332 by using the power supply from the transmission lines 226.

Further, the central control unit 320 may provide a notification to the server system 120 related to discontinuity of the power supply from the electrical power supply system 202 to the user location 106. The server system 120 may transmit the payment amount associated with the electrical power supply system 202 to the user device 122 for receiving payment from the user 102. In one embodiment, the central control unit 320 may provide the notification related to the discontinuity of the power supply from the electrical power supply system 202 to the user device 122.

Further, the central control unit 320 is configured to disconnect the AC-DC PCUs 304 and 324 based on monitoring the state of charge (SoC) of the batteries 310 and 332. In particular, the AC-DC PCUs 304 and 324 are disconnected, if the SoC of the batteries 310 and 324 is determined to be low. The SoC of the batteries 310 and 332 may be low based at least on unavailability of power supply from the transmission lines 226 and the PV panels 206.

In one embodiment, the central control unit 320 is configured to operate the circuit breakers 316 and 318 to the disconnected state, if the time credit is determined to be less than the predefined threshold value. Further, the AC-DC PCUs 304, 324 and 336 may be prevented from power production as explained above. In this scenario, the user location 106 may be provided with power supply from the transmission lines 226. For instance, a main switchboard (not shown in FIGS.) may be used at the user location 106 for receiving the power supply from the transmission lines 226. As such, the power supply from the transmission lines 226 may be delivered to the electrical power supply system 202 via the main switchboard for charging the batteries 310 and 332. Further, the power supply from the main switchboard may be distributed to the electrical loads present at the user location 106.

Additionally, the user 102 may generate power in non-supported ways, upon disconnection of the power supply from the electrical power supply system 202 due to delinquency in payment. In other words, the user 102 may generate power by tampering the electrical power supply system 202. For instance, the user 102 may open an enclosure of the gateway AC battery 204a to manually connect the circuit breakers 316 and 318 to continue operating the electrical power supply system 202 by the charged batteries 310 and 332. In this scenario, the central control unit 320 is configured to detect the opening of the enclosure by mechanical switches (not shown in FIGS.) configured on the enclosure and communicably coupled to the central control unit 320. The mechanical switches open when the enclosure of the gateway AC battery 204a is removed. In this case, the central control unit 320 automatically transmits the electrical power supply system 202 to the off-state (i.e., no-power state). More specifically, the central control unit 320 operates the circuit breaker 314 to the disconnected state (e.g., as shown in FIG. 3A) that de-energizes and prevents charging of the batteries 310 and 332. The stored charges in the batteries 310 and 332 may be transferred to the transmission lines 226 prior to the operation of the circuit breaker 314 to the disconnected state. Thus, the power supply from the PV panels 206 and the AC batteries 204a and 204b is disconnected at the user location 106.

The electrical power supply system 202 ceases to work, if the user 102 fails to pay the payment amount associated with the electrical power supply system 202 for a prolonged period. In other words, the electrical power supply system 202 ceases to work, in case of absence of communication for a prolonged period between the AC-DC PCUs 304 and 324 in the AC batteries 204a and 204b, and the PV panels 206 with the gateway AC battery 204a.

In another example scenario, the user 102 may remove at least one AC-DC PCU of the AC-DC PCUs 304 and 324 for generating AC power in the electrical power supply system 202. Particularly, the at least one AC-DC PCU may be connected directly to the batteries 310 and 332 for supplying power to the electrical loads at the user location 106. In this scenario, the central control unit 320 is configured to provide the first signal to the AC-DC PCUs 304 and 324. The first signal prevents operation of the AC-DC PCUs 304 and 324 to supply power to the user location 106 as explained above. It is noted that, the AC-DC PCUs 304 and 324 do not operate until commanded by the central control unit 320. In an embodiment, the central control unit 320 may also provide the first signal to the AC-DC PCU 336 to prevent power production from the PV panels 206.

In one embodiment, the user location 106 may not be equipped with the PV panels 206. In this scenario, the batteries 310 and 332 may be charged by the power supply from the transmission lines 226 as explained above. Further, the central control unit 320 is configured to perform one or more operations to control the power supply to the user location 106 based at least on monitoring the power supply from the transmission lines 226 and the payment status associated with the electrical power supply system 202 as described above.

Figure 4:
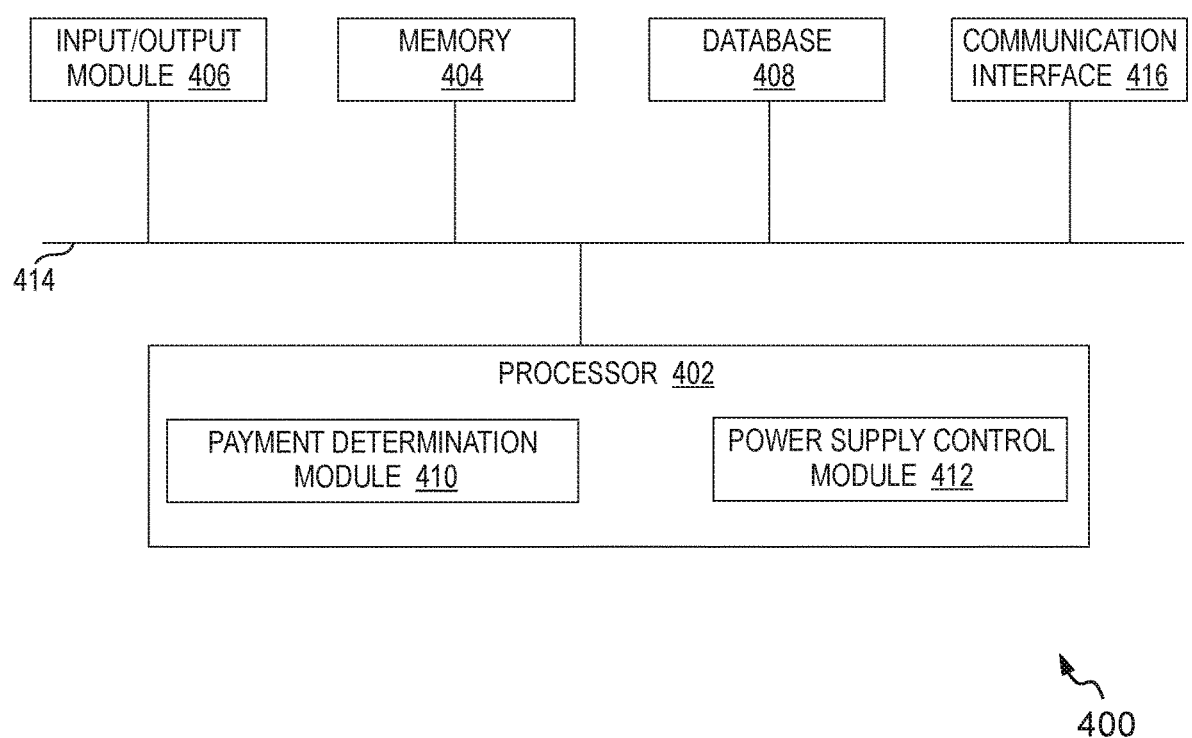
FIG. 4 is a block diagram representation of the central control unit of the gateway AC battery of the electrical power supply system of FIG. 2, in accordance with an example embodiment of the present disclosure.

FIG. 4, in one exemplary embodiment of the present disclosure, is a block diagram representation of a central control unit 400 similar to the central control unit 320 as shown in FIGS. 3A and 3B. The central control unit 400 is configured to operate a system such as, the electrical power supply system 202 as shown in FIG. 2. The central control unit 400 includes various processing modules for operating the electrical power supply system 202. The processing modules described herein may be implemented by a combination of hardware, software, and firmware components.

The central control unit 400 includes a processor 402, a memory 404, an input/output module 406, and a database 408. The one or more components of the central control unit 400 communicate with each other via a bus 414. The processor 402 includes a payment determination module 410 and a power supply control module 412. It is noted that although the central control unit 400 is depicted to include only one processor 402, the central control unit 400 may include a number of processors. Moreover, it shall be noted that the components are shown for exemplary purposes and the central control unit 400 may include fewer or additional modules than those depicted in FIG. 4.

In an embodiment, the memory 404 is capable of storing machine-executable instructions. Further, the processor 402 is capable of executing the machine executable instructions to perform the functions described herein. The processor 402 embodies or is in communication with the components, such as the payment determination module 410 and the power supply control module 412. In an embodiment, the processor 402 may be embodied as a multi-core processor, a single core processor, or a combination of one or more multi-core processors and one or more single core processors. For example, the processor 402 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 402 may be configured to execute hard coded functionality. In an embodiment, the processor 402 is embodied as an executor of software instructions, wherein the instructions may specifically configure the processor 402 to perform the algorithms and/or operations described herein when the instructions are executed.

The memory 404 may be embodied as one or more volatile memory devices, one or more non-volatile memory devices, and/or a combination of one or more volatile memory devices and non-volatile memory devices. For example, the memory 404 may be embodied as magnetic storage devices (such as hard disk drives, floppy disks, magnetic tapes, etc.), optical magnetic storage devices (e.g. magneto-optical disks), CD-ROM (compact disc read only memory), CD-R (compact disc recordable), CD-R/W (compact disc rewritable), DVD (Digital Versatile Disc), BD (Blu-ray® Disc), and semiconductor memories (such as mask ROM, PROM (programmable ROM), EPROM (erasable PROM), flash memory, RAM (random access memory), etc.).

In an embodiment, the input/output module 406 may include mechanisms configured to receive input signals, such as the notification from the server system 120 or the unique dynamic code from the user 102 and also provide output signal such as the first signal to the AC-DC PCUs 304 and 324, and the connect signal to the circuit breakers 314, 316 and 318. To that effect, the input/output module 406 may include at least one input interface and/or at least one output interface. Further, the input signal or the output signal is received or transmitted respectively, via a communication interface 416 of the central control unit 400.

The central control unit 400 includes a database 408 configured for storing information pertaining to the electrical power supply system 202. The database 408 may also be configured to store information pertaining to energy consumption data from the transmission lines, time credit data, payment cycle, transaction records and the like. The database 408 may be encrypted suitably for ensuring the security of the stored information.

The payment determination module 410 may be configured to determine the payment status associated with the electrical power supply system 202. Particularly, the module 410 is configured to determine the payment status based on the time credit. The module 410 determines the payment status to be not normal, if the time credit is less than the predefined value or expired. Further, the module 410 determines the payment status to be normal, if the time credit is greater than the predefined value. Furthermore, the module 410 may be configured to update the time credit based at least on receiving the notification and the unique dynamic code as explained with reference to FIGS. 1 and 2.

The module 412 may be configured to control the power supply from the electrical power supply system 202. The module 412 is configured to monitor the power supply from the transmission lines 226 to operate the AC batteries 204a and 204b for supplying power to the user location 106. More specifically, the module 412 may stop sending the connect signal to the circuit breaker 314, if the power supply from the transmission lines 226 is determined to be interrupted. The module 412 may be configured to provide the control signal to the control unit 332 for operating the expansion AC battery 204b to provide power supply based on the energy requirements or load demands at the user location 106. Further, the module 412 may be configured to provide the connect signal to the circuit breaker 314, if the power supply from the transmission lines 226 is available. The module 412 may be configured to either disconnect or continue the power supply to the user location 106 based on determining the payment status associated with the electrical power supply system 202. Additionally, the module 412 may be configured to detect the power supply from the electrical power supply system 202 in non-supported ways as explained with reference to FIGS. 3A and 3B. For the sake of brevity, the one or more operations performed by central control unit 400 are herein not explained in detail.

Figure 5:
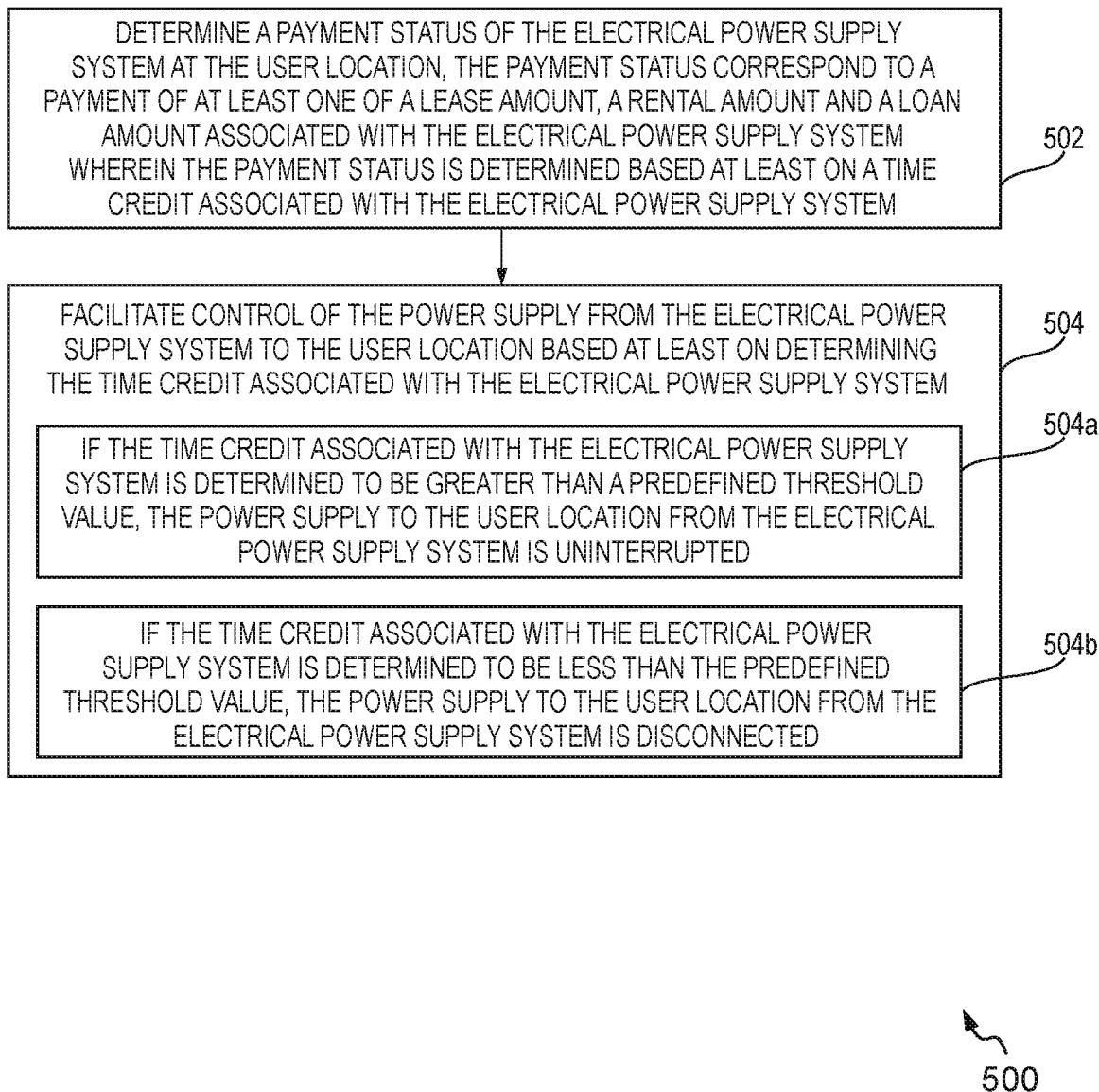
FIG. 5 is a flow diagram depicting a method for automatically controlling power supply to the user location, in accordance with an embodiment of the present disclosure.

FIG. 5 represents a flow diagram depicting a method 500 for automatically controlling power supply from an electrical power supply system to a user location, such as the user location 106, in accordance with an example embodiment of the present disclosure. The method 500 depicted in the flow diagram may be executed by a central control unit (e.g. the central control unit 320). Operations of the method 500 and combinations of operation in the flow diagram, may be implemented by, for example, hardware, firmware, a processor, circuitry and/or a different device associated with the execution of software that includes one or more computed program instructions. The method 500 starts at operation 502.

At operation 502, the central control unit determines the payment status of the electrical power supply system at the user location. The payment status corresponds to the payment of at least one of the lease amount, the rental amount and the loan amount associated with the electrical power supply system. The payment status is determined based at least on the time credit associated with the electrical power supply system.

At operation 504, the central control unit facilitates control of the power supply from the electrical power supply system to the user location based at least on determining the time credit associated with the electrical power supply system. The power supply to the user location from the electrical power supply system is uninterrupted, if the time credit associated with the electrical power supply system is determined to be greater than a predefined threshold value (see, 504a of FIG. 5). The predefined threshold value can be any number including zero that is predefined. The power supply to the user location from the electrical power supply system is disconnected, if the time credit associated with the electrical power supply system is determined to be less than the predefined threshold value (see, 504b of FIG. 5). Further, the operations 502-504, for automatically controlling the power supply from the electrical power supply system to the user location by the central control unit 320 based on payment status are already described in detail in description pertaining to FIG. 2 and FIGS. 3A and 3B.

Additionally, the central control unit transmits the first signal to the at least one AC-DC power conditioning unit (PCU) of the gateway AC battery and the at least one expansion AC battery, if the time credit associated with the electrical power supply system is less than the predefined threshold value. The first signal prevents the at least one AC-DC power conditioning unit (PCU) to generate power, thus resulting in disconnection of the power supply from the electrical power supply system to the user location.

The central control unit stops sending the connect signal to the circuit breaker electrically connected to the power receiving port of the gateway AC battery, if the power supply from one or more transmission lines is determined to be interrupted. The absence of the connect signal operates the circuit breaker to the disconnected state from the connected state, thus decoupling the one or more transmission lines from the electrical power supply system. In this scenario, the at least one AC-DC PCU of the gateway AC battery and the expansion AC battery operates to supply power from the electrical power supply system to the user location, if the power supply from the one or more transmission lines is interrupted. Further, the central control unit transmits the connect signal to the circuit breaker electrically connected to the power receiving port of the gateway AC battery, if the power supply from the transmission lines is available. The connect signal operates the circuit breaker to the connected state from the disconnected state for coupling the one or more transmission lines to the electrical power supply system to provide power supply to the user location. The central control unit is further configured to monitor one or more parameters of the power supply for coupling the one or more transmission lines to the electrical power supply system. The one or more parameters of the power supply include voltage amplitude, frequency, and phase angle. The description pertaining to the operation of the circuit breaker electrically connected to the power receiving port and the AC-DC PCU by the central control unit based on monitoring the power supply from the transmission lines is already described in detail in descriptions pertaining to FIGS. 3A and 3B, and is not reiterated in this section for the sake of brevity.

Further, the time credit of the electrical power supply system is updated based on the successful payment of the at least one of the lease amount, the rental amount and the loan amount of the previous payment cycle associated with the electrical power supply system. Upon successful payment, the power supply from the electrical power supply system is uninterrupted to the user location until the end of the next payment cycle. In one form, the server system transmits the notification indicative of successful payment of the at least one of the lease, rental and loan amount of the previous payment cycle to the central control unit. In another form, the unique dynamic code is manually entered on the input interface configured on the gateway AC battery by the user of the user location. The unique dynamic code is transmitted by the server system to the user device of the user based on the successful payment of the at least one of the lease, rental and loan amount of the previous payment cycle.

Figure 6:
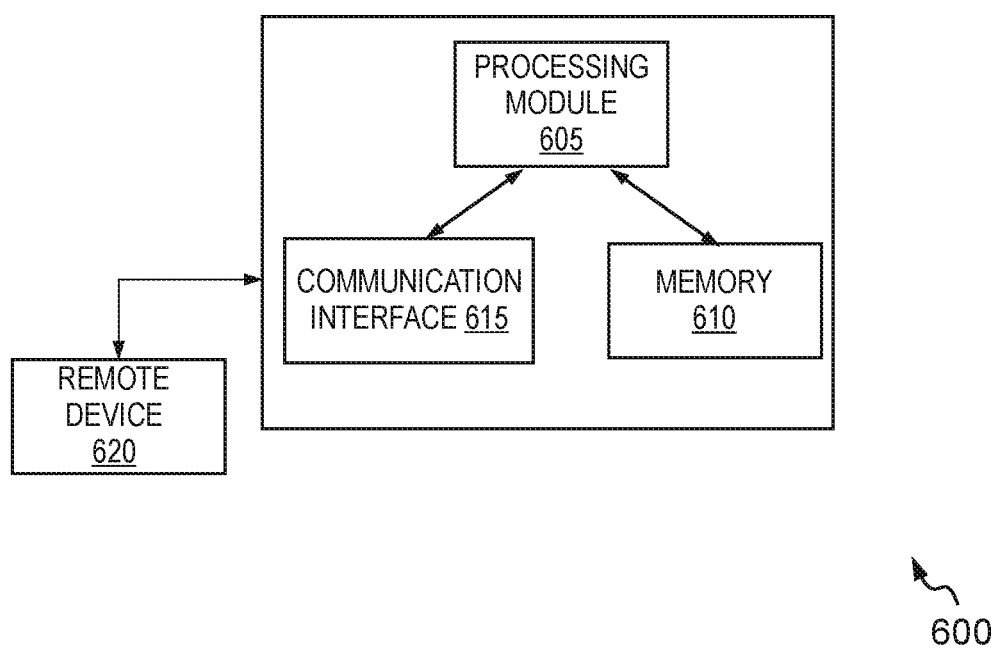
FIG. 6. is a block diagram of a control unit of at least one expansion AC battery of the electrical power supply system of FIG. 2, in accordance with one embodiment of the present disclosure.

FIG. 6 is a simplified block diagram of a control unit 600 of at least one expansion AC battery, such as the at least one expansion AC battery 204b of FIG. 2, in accordance with one embodiment of the present disclosure. The control unit 600 is an example of the control unit 334 of the expansion AC battery 204b of FIG. 2. The control unit 600 includes a processing module 605 configured to extract programming instructions from a memory 610 to provide various features of the present disclosure. The components of the control unit 600 provided herein may not be exhaustive and that the control unit 600 may include more or fewer components than those depicted in FIG. 6. Further, two or more components may be embodied in one single component, and/or one component may be configured using multiple sub-components to achieve the desired functionalities. Some components of the control unit 600 may be configured using hardware elements, software elements, firmware elements and/or a combination thereof.

Via a communication interface 615, the processing module 605 receives information from a remote device 620 such as, the central control unit 400, and the server system 120. The control unit 600 may be configured to charge the expansion AC battery and deliver power from the expansion AC battery based on receiving a control signal from the central control unit 400 or the central control unit 320. The control unit 600 prevents operation of the AC-DC PCU of the expansion AC battery based on receipt of the first signal from the central control unit 400. Further, the control unit 600 may disconnect the AC-DC PCU of the expansion AC battery based on the state of charge (SoC), fault and tamper conditions as explained with reference to FIGS. 3A and 3B. In one embodiment, the control unit 600 may also perform similar operations as performed by the central control unit 400 or the central control unit 320.

Figure 7:
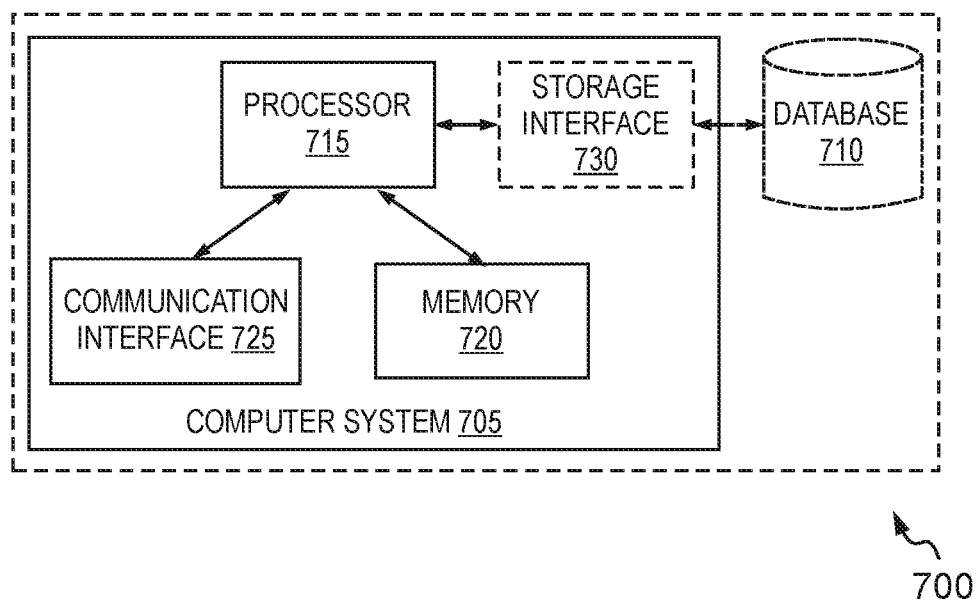
FIG. 7 is a block diagram of a server capable of implementing at least some embodiments of the present disclosure.

FIG. 7 illustrates a block diagram representation of a server system 700 capable of implementing at least some embodiments of the present disclosure. An example of the server system 700 is the server system 120 shown and described with reference to FIG. 1. The server system 600 includes a computer system 705 and a database 710.

The computer system 705 includes at least one processor 715 for executing instructions. Instructions may be stored in, for example, but not limited to, a memory 720. The processor 715 may include one or more processing units (e.g., in a multi-core configuration).

The memory 720 is a storage device embodied as one or more volatile memory devices, one or more non-volatile memory devices, and/or a combination of one or more volatile memory devices and non-volatile memory devices, for storing micro-contents information and instructions. The memory 720 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (Blu-ray® Disc), and semiconductor memories (such as mask ROM, PROM (programmable ROM), EPROM (erasable PROM), flash ROM, RAM (random access memory), etc.).

The processor 715 is operatively coupled to a communication interface 725 such that the computer system 705 is capable of communicating with a mobile device, for example, the device 122 or with any entity within the network 126 via the communication interface 725.

The processor 715 may also be operatively coupled to the database 710. The database 710 is any computer-operated hardware suitable for storing and/or retrieving data, such as, but not limited to, the energy consumption data, data obtained during operation of the system 200 and the like. The database 710 may include multiple storage units such as hard disks and/or solid-state disks in a redundant array of independent disks (RAID) configuration. The database 710 may include a storage area network (SAN) and/or a network attached storage (NAS) system.

In some embodiments, the database 710 is integrated within the computer system 705. For example, the computer system 705 may include one or more hard disk drives as the database 710. In other embodiments, the database 710 is external to the computer system 705 and may be accessed by the computer system 705 using a storage interface 730. The storage interface 730 is any component capable of providing the processor 715 with access to the database 710. The storage interface 730 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 715 with access to the database 710.

The processor 715 is communicably coupled with the memory 720 and the communication interface 725. The processor 715 is capable of executing the stored machine executable instructions in the memory 720 or within the processor 715 or any storage location accessible to the processor 715. The processor 715 may be embodied in a number of different ways. In an example embodiment, the processor 715 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. The processor 715 performs various functionalities of the server system 600 as described herein.

The disclosed methods with reference to FIGS. 1 to 7, or one or more operations of the flow diagrams of method 500 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components)) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means includes, for example, the Internet, the World Wide Web, an intranet, software applications, cable (including fiber optic cable), magnetic communications, electromagnetic communications (including RF, microwave, and infrared communications), mobile communications, or other such communication means.

Various embodiments of the disclosure, as discussed above, may be practiced with steps and/or operations in a different order, and/or with hardware elements in configurations, which are different than those which, are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. An electrical power supply system for providing power supply to a user location, the system comprising:
a gateway alternating current (AC) battery comprising at least one AC-DC power conditioning unit (PCU) and a central control unit, the central control unit configured to at least:
determine a payment status of the electrical power supply system at the user location, the payment status correspond to a payment of at least one of a lease amount, a rental amount and a loan amount associated with the electrical power supply system, wherein the payment status is determined based at least on a time credit associated with the electrical power supply system, and
facilitate control of the power supply from the electrical power supply system to the user location based at least on determining the time credit associated with the electrical power supply system,
wherein the power supply to the user location from the electrical power supply system is uninterrupted, if the time credit associated with the electrical power supply system is determined to be greater than a predefined threshold value,
wherein the power supply to the user location from the electrical power supply system is disconnected, if the time credit associated with the electrical power supply system is determined to be less than the predefined threshold value, and
wherein the central control unit is further configured to transmit a first signal to the at least one AC-DC power conditioning unit (PCU) of the gateway AC battery and at least one expansion AC battery electrically connected to the gateway AC battery, if the time credit associated with the electrical power supply system is less than the predefined threshold value, wherein the first signal prevents the at least one AC-DC power conditioning unit (PCU) to generate power, thus resulting in disconnection of the power supply from the electrical power supply system to the user location.

2. The system as claimed in claim 1, wherein the central control unit is configured to stop sending a connect signal to a circuit breaker electrically connected to a power receiving port of the gateway AC battery, if the power supply from one or more transmission lines is determined to be interrupted, wherein the absence of the connect signal operates the circuit breaker to a disconnected state from a connected state, thus decoupling the one or more transmission lines from the electrical power supply system.

3. The system as claimed in claim 2, wherein the at least one AC-DC power conditioning unit (PCU) of the gateway AC battery and the at least one expansion AC battery operate to supply power from the electrical power supply system to the user location, if the power supply from the one or more transmission lines is interrupted.

4. The system as claimed in claim 2, wherein the central control unit is configured to transmit the connect signal to the circuit breaker electrically connected to the power receiving port of the gateway AC battery, if the power supply from the one or more transmission lines is determined to be available, wherein the connect signal operates the circuit breaker to the connected state from the disconnected state for coupling the one or more transmission lines to the electrical power supply system to provide power supply to the user location.

5. The system as claimed in claim 4, wherein the central control unit is configured to monitor one or more parameters of the power supply for coupling the one or more transmission lines to the electrical power supply system, wherein the one or more parameters of the power supply include voltage amplitude, frequency, and phase angle.

6. The system as claimed in claim 1, wherein the central control unit is configured to update the time credit of the electrical power supply system based on successful payment of the at least one of the lease amount, the rental amount and the loan amount of a previous payment cycle associated with the electrical power supply system.

7. The system as claimed in claim 6, wherein the time credit is updated based at least on:
receive a notification indicative of successful payment of the at least one of the lease amount, the rental amount and the loan amount of the previous payment cycle from a server system communicably coupled to the central control unit; and
receive a unique dynamic code on an input interface configured on the gateway AC battery by a user of the user location, wherein the unique dynamic code is transmitted by the server system to a user device of the user upon successful payment of the at least one of the lease amount, the rental amount and the loan amount of the previous payment cycle.

8. A method performed by a central control unit for automatically controlling power supply from an electrical power supply system to a user location, the method comprising:
determining a payment status of the electrical power supply system at the user location, the payment status correspond to a payment of at least one of a lease amount, a rental amount and a loan amount associated with the electrical power supply system, wherein the payment status is determined based at least on a time credit associated with the electrical power supply system; and
facilitating control of the power supply from the electrical power supply system to the user location based at least on determining the time credit associated with the electrical power supply system,
wherein the power supply to the user location from the electrical power supply system is uninterrupted, if the time credit associated with the electrical power supply system is determined to be greater than a predefined threshold value,
wherein the power supply to the user location from the electrical power supply system is disconnected, if the time credit associated with the electrical power supply system is determined to be less than the predefined threshold value, and
wherein a first signal is transmitted to at least one AC-DC power conditioning unit (PCU) of a gateway AC battery and at least one expansion AC battery, if the time credit associated with the electrical power supply system is less than the predefined threshold value, wherein the first signal prevents the at least one AC-DC power conditioning unit (PCU) to generate power, thus resulting in disconnection of the power supply from the electrical power supply system to the user location.

9. The method as claimed in claim 8, wherein a connect signal to a circuit breaker electrically connected to a power receiving port of the gateway AC battery is stopped, if the power supply from one or more transmission lines is determined to be interrupted, wherein the absence of the connect signal operates the circuit breaker to a disconnected state from a connected state, thus decoupling the one or more transmission lines from the electrical power supply system.

10. The method as claimed in claim 9, wherein the at least one AC-DC power conditioning unit (PCU) of the gateway AC battery and the at least one expansion AC battery operate to supply power from the electrical power supply system to the user location, if the power supply from the one or more transmission lines is interrupted.

11. The method as claimed in claim 9, further comprising:
transmitting the connect signal to the circuit breaker electrically connected to the power receiving port of the gateway AC battery, if the power supply from the one or more transmission lines is determined to be available, wherein the connect signal operates the circuit breaker to the connected state from the disconnected state for coupling the one or more transmission lines to the electrical power supply system to provide power supply to the user location.

12. The method as claimed in claim 11, further comprising:
monitoring one or more parameters of the power supply for coupling the one or more transmission lines to the electrical power supply system, wherein the one or more parameters of the power supply include voltage amplitude, frequency, and phase angle.

13. The method as claimed in claim 8, wherein the time credit of the electrical power supply system is updated based on successful payment of the at least one of the lease amount, the rental amount and the loan amount of a previous payment cycle associated with the electrical power supply system.

14. The method as claimed in claim 13, wherein the time credit is updated based at least on:
receiving a notification indicative of successful payment of the at least one of the lease amount, the rental amount and the loan amount of the previous payment cycle from a server system communicably coupled to the central control unit; and
receiving a unique dynamic code on an input interface configured on the gateway AC battery by a user of the user location, wherein the unique dynamic code is transmitted by the server system to a user device of the user upon successful payment of the at least one of the lease amount, the rental amount and the loan amount of the previous payment cycle.

15. A method performed by a central control unit for automatically controlling power supply from an electrical power supply system to a user location, the method comprising:
determining a payment status of the electrical power supply system at the user location, the payment status correspond to a payment of at least one of a lease amount, a rental amount and a loan amount associated with the electrical power supply system, wherein the payment status is determined based at least on a time credit associated with the electrical power supply system; and
facilitating control of the power supply from the electrical power supply system to the user location based at least on determining the time credit associated with the electrical power supply system,
wherein the power supply to the user location from the electrical power supply system is uninterrupted, if the time credit associated with the electrical power supply system is determined to be greater than a predefined threshold value,
wherein the power supply to the user location from the electrical power supply system is disconnected, if the time credit associated with the electrical power supply system is determined to be less than the predefined threshold value, and wherein a first signal is transmitted to at least one AC-DC power conditioning unit (PCU) of a gateway AC battery and at least one expansion AC battery, if the time credit associated with the electrical power supply system is less than the predefined threshold value, wherein the first signal prevents the at least one AC-DC power conditioning unit to generate power, thus resulting in disconnection of the power supply from the electrical power supply system to the user location.

16. The method as claimed in claim 15, wherein a connect signal to a circuit breaker electrically connected to a power receiving port of the gateway AC battery is stopped, if the power supply from one or more transmission lines is determined to be interrupted, wherein the absence of the connect signal operates the circuit breaker to a disconnected state from a connected state, thus decoupling the one or more transmission lines from the electrical power supply system.

17. The method as claimed in claim 15, further comprising:
   transmitting the connect signal to the circuit breaker electrically connected to the power receiving port of the gateway AC battery, if the power supply from the one or more transmission lines is determined to be available, wherein the connect signal operates the circuit breaker to the connected state from the disconnected state for coupling the one or more transmission lines to the electrical power supply system to provide power supply to the user location.

18. The method as claimed in claim 15, wherein the time credit of the electrical power supply system is updated based on successful payment of the at least one of the lease amount, the rental amount and the loan amount of a previous payment cycle associated with the electrical power supply system, wherein the time credit is updated based at least on:
   receiving a notification indicative of successful payment of the at least one of the lease amount, the rental amount and the loan amount of the previous payment cycle from a server system communicably coupled to the central control unit; and
   receiving a unique dynamic code on an input interface configured on the gateway AC battery by a user of the user location, wherein the unique dynamic code is transmitted by the server system to a user device of the user upon successful payment of the at least one of the lease amount, the rental amount and the loan amount of the previous payment cycle.

* * * * *